United States Patent [19]

Kaminiski et al.

[11] Patent Number: 4,993,891
[45] Date of Patent: Feb. 19, 1991

[54] MILLING CUTTER WITH GRINDING INSERTS

[75] Inventors: Brian D. Kaminiski, Southfield; Joseph W. Matthews, Rochester Hills; Gary L. Gaffney, Sylvan Lake, all of Mich.

[73] Assignee: General Motors Corporation, Detroit, Mich.

[21] Appl. No.: 481,939

[22] Filed: Feb. 20, 1990

[51] Int. Cl.⁵ .............................................. B23C 5/06
[52] U.S. Cl. ....................................... 407/42; 407/51; 407/61
[58] Field of Search ................... 407/42, 34, 35, 53, 407/54, 55, 56, 57, 60, 61, 62, 64, 51

[56] References Cited

U.S. PATENT DOCUMENTS

| | | | |
|---|---|---|---|
| 2,411,784 | 11/1946 | Goldsmith | 407/55 |
| 4,194,860 | 3/1980 | Hopkins | 407/42 |
| 4,352,609 | 10/1982 | Hopkins | 407/42 |
| 4,586,855 | 5/1986 | Rowle | 407/55 |
| 4,728,228 | 3/1988 | Okunishi et al. | 407/35 |
| 4,743,144 | 5/1988 | Shikata | 407/42 |
| 4,789,273 | 12/1988 | Wiacek et al. | 407/34 |

FOREIGN PATENT DOCUMENTS 2533261  10/1977  Fed. Rep. of Germany ........ 407/42

*Primary Examiner*—D. S. Meislin
*Assistant Examiner*—Blynn Shideler
*Attorney, Agent, or Firm*—Patrick M. Griffin

[57] ABSTRACT

A milling cutter with a plurality of grinding inserts in a unique orientation to remove the machining marks of the roughing inserts and texture the surface to a consistently roughened flat finish.

3 Claims, 2 Drawing Sheets

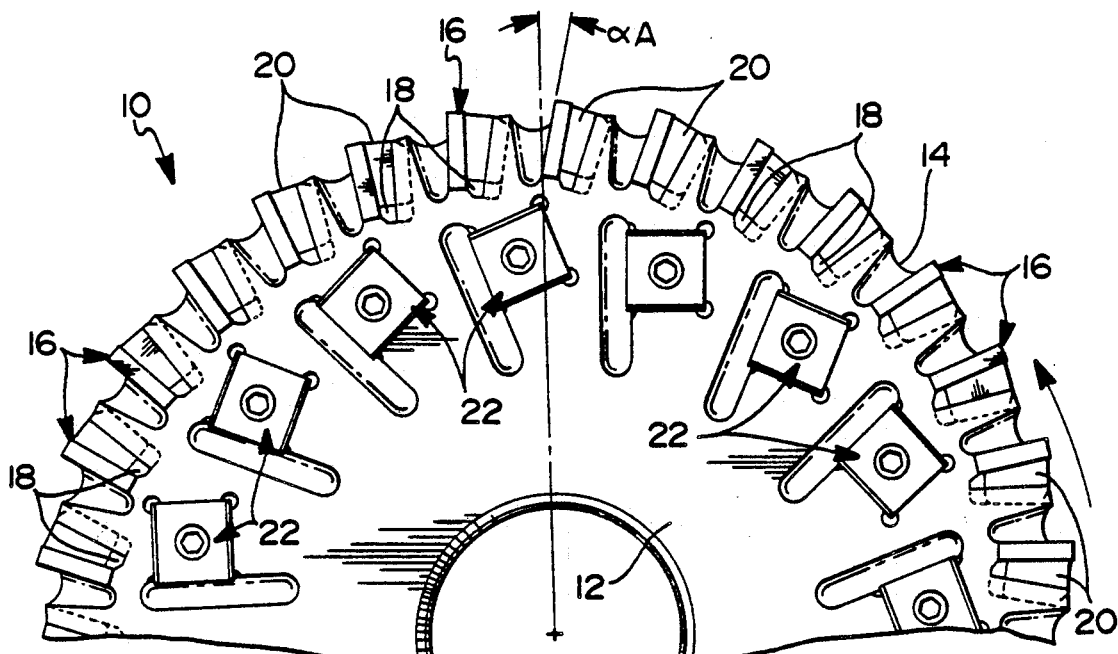
FIG 1
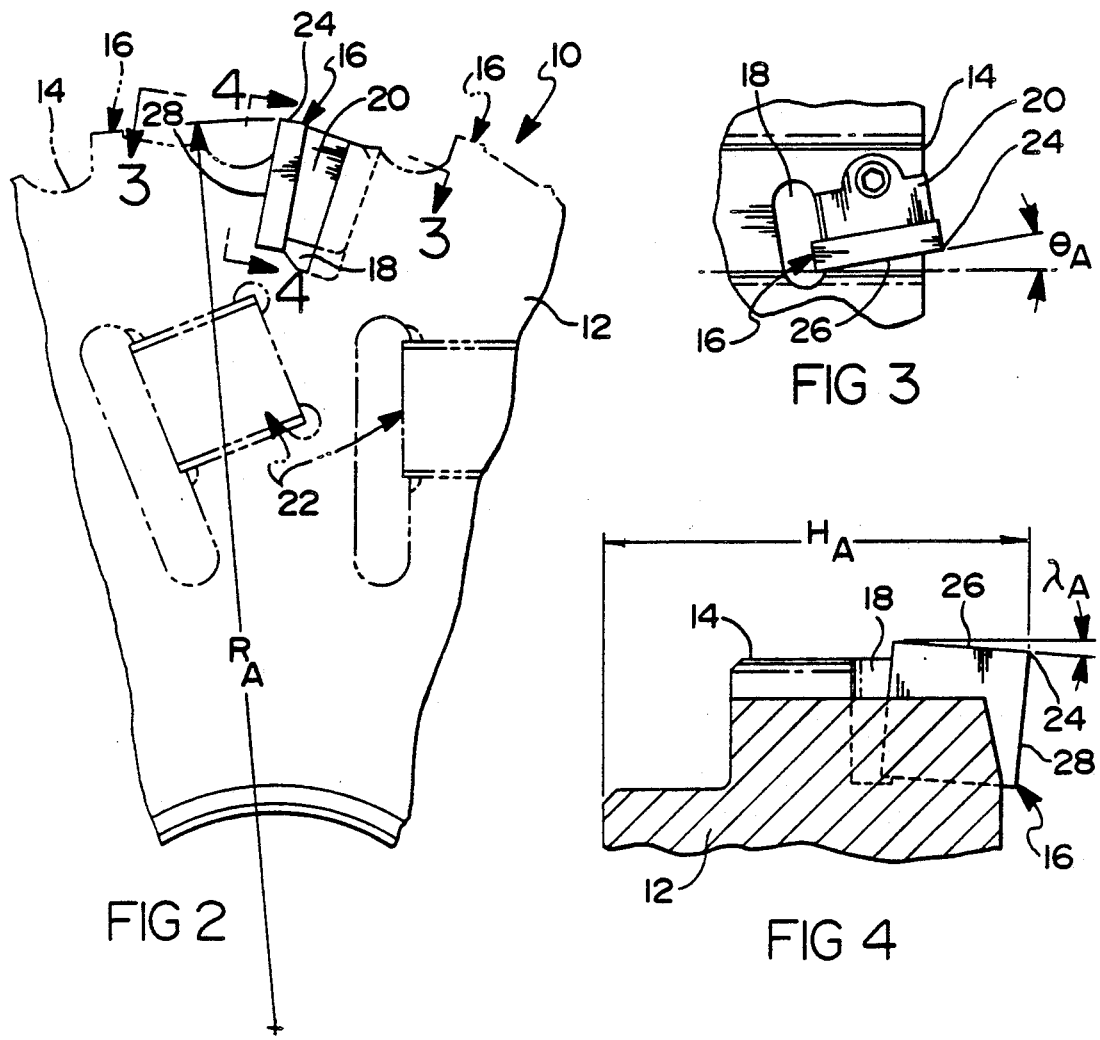
FIG 2
FIG 3
FIG 4

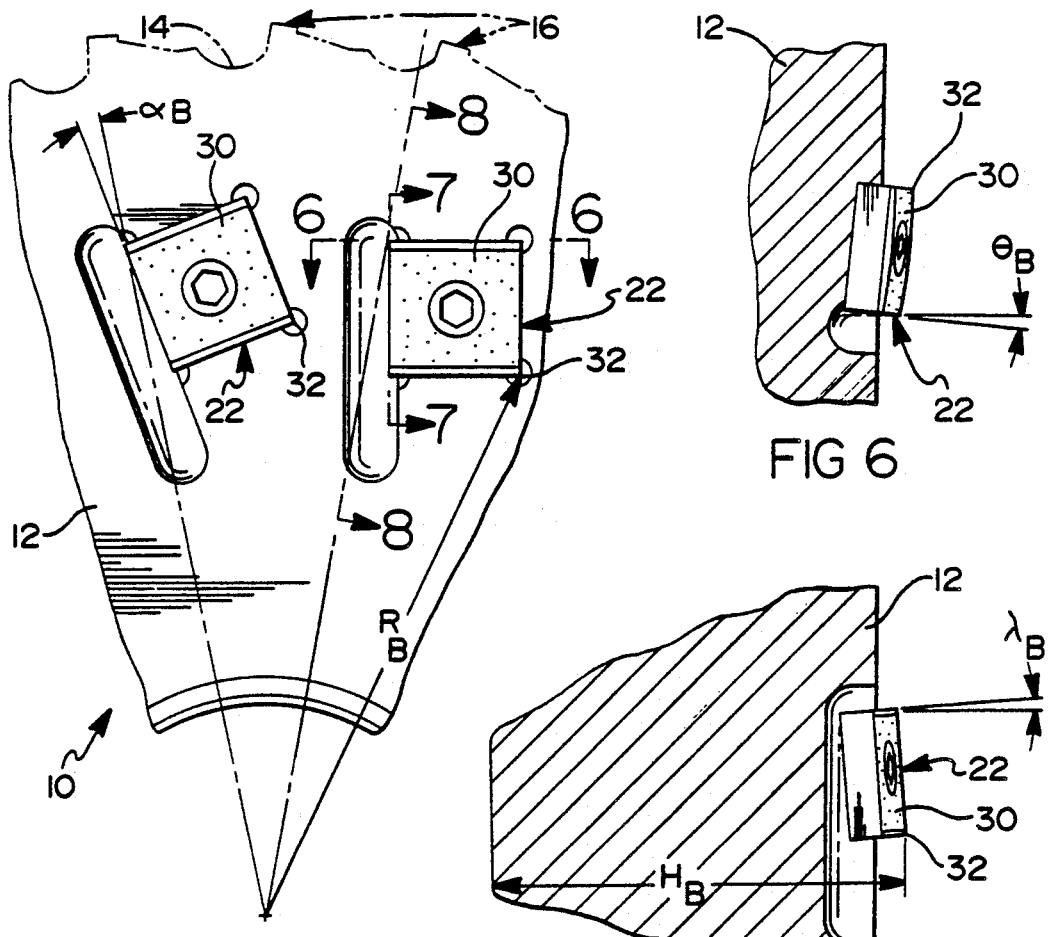
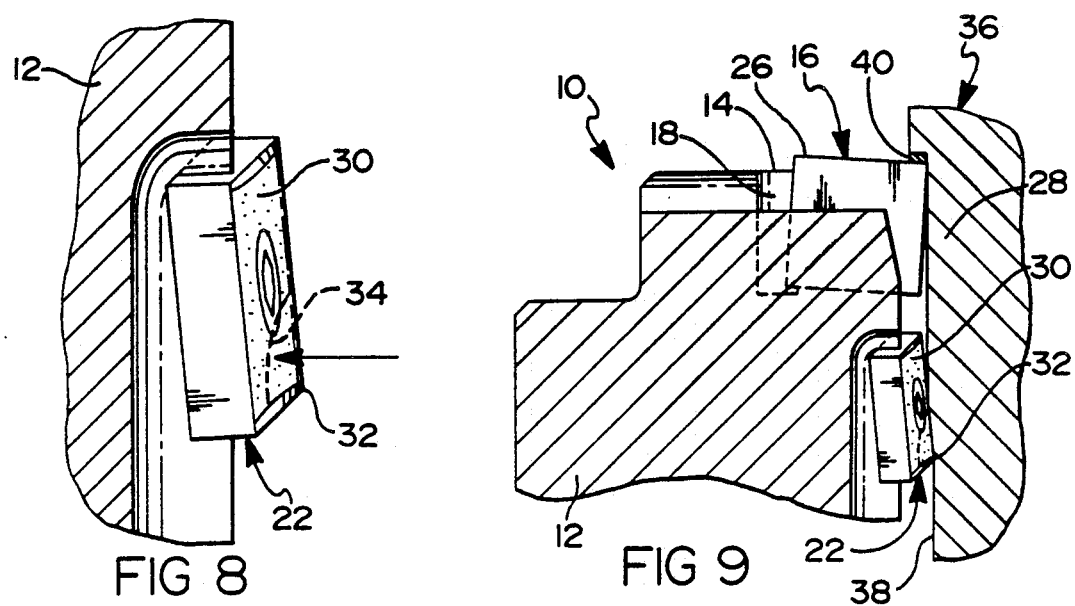

MILLING CUTTER WITH GRINDING INSERTS

This invention relates to milling cutters in general, and specifically to a milling cutter which has a plurality of grinding inserts arrayed in a novel orientation.

BACKGROUND OF THE INVENTION

Face milling cutters are commonly used to mill a flat gasket surface on a workpiece, such as the joint face surface of a cast iron engine cylinder head. Such surfaces must be smooth, but not so smooth as to cause the gasket to slip. Just as important is the waviness of the surface. "Waviness" is basically a mathematical measure of the disparity of peaks and valleys in the surface, which, if too severe, can prevent a gasket from compressing evenly, and threaten seal integrity.

Face milling cutters typically have a cylindrical cutter body with a circular array of cutting inserts mounted on the outer edge. These are sometimes called roughing inserts, because they take the initial cut. Such inserts are often rectangular or square, a plurality of cutting corners and edges. Generally, a roughing insert is mounted in a pocket cut into the outer edge of the cutter body, and is tipped in toward the axis of the cutter body with what is known as a lead angle. A lead angle assures that only the corner, and a short length of insert edge inboard of the corner, touches the milled surface. This provides clearance between the corner from the milled surface.

Because of the short, discrete length of the part of the roughing inserts that actually touches the workpiece milled surface, they inevitably leave behind visible machining marks, sometimes called scallops. This may cause an unacceptable level of waviness in the milled surface, if the cutter is advanced at too rapid a feed rate. Lowering the feed rate can decrease waviness, but productivity is directly proportional to feed rate. Therefore, so called finishing or "wiper" inserts are often mounted radially inboard of the roughing inserts with a very slight axial step, just enough to finish up and smooth the surface. Wiper inserts have long cutting edges, and are mounted with essentially no lead angle, so that most of those long cutting edges see the surface. This reduces waviness, but can actually leave a surface that is too smooth, as evidenced by a distinct surface shine. A too smooth surface also threatens seal integrity, since the seal material can slip on the surface.

SUMMARY OF THE INVENTION

The invention discloses an improved face milling cutter in which the conventional wiping inserts are replaced by grinding inserts mounted with a unique geometry. A milled surface is created that is sufficiently flat, but which is roughened and textured in a consistent and beneficial fashion.

In the preferred embodiment disclosed, a cylindrical steel cutter body is rotated about its axis as it is driven linearly across the workpiece. A plurality of roughing inserts are mounted in a circular array in individual pockets cut into the outer edge of the cutter body. Inboard of the roughing inserts are a plurality of square grinding inserts, each with an abrasive upper surface. The grinding inserts are also mounted in a circular array, and at a slight axial step relative to the roughing inserts. Each grinding insert is mounted substantially flat, but tipped away from dead flat in a deliberate manner.

Each grinding insert has a small positive axial rake angle, and a small lead angle that has the opposite direction of a conventional lead angle. This serves to elevate slightly the radially inner, trailing corner of the grinding surface. This alone would present only a small trailing portion of the grinding surface to the workpiece. In addition, however, the grinding insert has a small positive radial rake angle, which twists the insert around enough to present more of the grinding surface, a sufficient working area, to the workpiece surface. The working areas of the grinding surfaces are dragged across the workpiece surface, removing the machining marks and grinding the surface to a flat, consistently roughened surface, which is ideal for a sealing surface. The elevated trailing corners of the grinding inserts are thereby forced down into the cutter body. However, the radial rake angle is kept small enough to keep the elevated trailing corner radially well away from the outer edge of the cutter body, so that it is not over stressed.

It is, therefore, a general object of the invention to provide a face milling cutter that produces a sufficiently flat milled surface that is also consistently roughened to provide a good sealing surface.

It is another object of the invention to provide such a milling cutter that has cutting inserts mounted to the outer edge of the cutter body, and grinding inserts mounted inboard thereof and specially oriented so as to present a defined working area of the grinding surface to the workpiece, which will grind the workpiece surface without over stressing the cutter body.

It is another object of the invention to provide an improved face milling cutter in which the grinding inserts have a slight positive axial rake angle and a reversed lead angle, so as to elevate an inboard trailing corner of the insert, as well as a positive radial rake angle that is large enough to present a sufficient working area to the workpiece, but small enough to keep the working area and its stresses well away from the outer edge of the cutter body.

DESCRIPTION OF THE PREFERRED EMBODIMENT

These and other objects and features of the invention will appear from the following written description, and f drawings, in which:

FIG. 1 is a plan view of a portion of the cutter;

FIG. 2 is an enlarged portion of FIG. 1, showing one roughing insert in detail, and showing the position of the grinding inserts schematically;

FIG. 3 is a view taken along the line 3—3 of FIG. 2, illustrating the axial rake angle of the roughing inserts;

FIG. 4 is a view taken along the line 4—4 of FIG. 2, illustrating the lead angle of the roughing inserts;

FIG. 5 is a view like FIG. 2, but showing just the grinding inserts;

FIG. 6 is a view taken along the line 6—6 of FIG. 5, illustrating the axial rake angle of the grinding inserts;

FIG. 7 is a view taken along the line 7—7 of FIG. 5, illustrating the reversed lead angle of the grinding inserts;

FIG. 8 is a perspective view of one of the grinding inserts taken along a radial plane of the cutter body at the line 8—8 of FIG. 5, to illustrate the working area of the grinding insert surface;

FIG. 9 is a view of a portion of a workpiece being worked by the cutter.

Referring first to FIGS. 1 and 2, the preferred embodiment of the face milling cutter of the invention is indicated generally at 10. Cutter 10 has a cylindrical steel cutter body 12, which is ten inches in diameter and approximately 2-5/16 inches thick. Mounted to the outer edge 14 of cutter body 12 are a plurality of thirty two cutting or roughing inserts, indicated generally at 16. Roughing inserts 16 are mounted in a circular array, generally evenly spaced, but staggered slightly in what is known as a white noise pattern. More detail on the orientation of inserts 16 will be given below, but it will be noted here that each is mounted basically vertically, rather than flat. As such, each has a separate pocket 18 machined into cutter body edge 14, which must be large enough to accommodate a wedging block 20. This inevitably removes a good deal of metal from the edge 14, reducing its stiffness somewhat. Mounted radially inboard of roughing inserts 16 is an evenly spaced circular array of sixteen grinding inserts, indicated generally at 22.

Referring next to FIGS. 1 through 4, each roughing insert 16 is a commercially available silicon nitride insert, measuring ¾ inch square by 3/16 inch thick. Each has eight cutting corners, one of which is presented at a time, and constitutes the operative cutting corner, indicated at 24. Each cutting corner 24 is bounded by an outboard edge 26 and an inboard edge 28. The radius from the center axis of cutter body 14 to the cutting corner 24, indicated at $R_A$, is 5.031 inches, and its axial height, $H_A$, is 2.375 inches, measured from the back face of cutter body 12. The radial rake angle of insert 16, $\alpha_A$, is negative 9 degrees, and its axial rake angle, $\theta_A$, is also negative 9 degrees. Its lead angle, $\lambda_A$, is 2 degrees. As illustrated in FIG. 4, the lead angle serves to tip insert 16 inwardly, toward the axis of cutter body 14. As such, the cutting corner 24 is "elevated", the inboard edge 28 is tipped in, and the outboard edge 26 is tipped out, for reasons described below. Suffice to say at this point that while lead angles are often recommended to be as large as possible, even up to 45 degrees, there is no known recommendation that lead angles ever be reversed, or negative, as here. Lead angles are not even listed as positive or negative as such, so far as is known, since it is apparently not contemplated that they should be otherwise than as shown for insert 16.

Referring next to FIGS. 5 through 7, the unique orientation of the grinding inserts 22 is illustrated. Each grinding insert 22 has a ¾ inch square by 3/16 inch thick base of high speed steel, with an abrasive upper layer of cubic boron nitride having a grit size of approximately 60/80. The upper layer constitutes a grinding surface 30. Grinding insert 22 also has edges and corners, as does roughing insert 16, but it is the orientation and operation of the grinding surface 30 that is most significant. Still, the corners and edges of grinding insert 22 are useful reference points in orienting it. Basically, grinding insert 22 is mounted substantially flat to cutter body 14. However, it is deliberately tilted away from dead flatness in a very specific orientation so as to achieve a particular effect and operation. Grinding insert 22 is tilted so as to have an elevated trailing portion, specifically a rear trailing corner 32. Trailing corner 32 has a radius, $R_B$ of 3.39 inches, and an axial height $H_B$, of 2.385 inches. Consequently, trailing corner 32 has a significant radial differential or step relative to cutting corner 24, $R_A-R_B$, but a very small axial step, $H_B-H_A$. That radial differential is deliberately kept large, as described further below. Trailing corner 32 is elevated by giving grinding insert 22 a small axial rake angle, $\theta_B$, of positive ten degrees, and a small lead angle, $\lambda_B$, of five degrees, which is, in effect, negative, the reverse of a normal lead angle.

Referring next to FIGS. 5 and 8, if insert 22 were square to a radial plane of cutter body 14, then just elevating rear corner 32 alone would present only a small portion of grinding surface 30 to a workpiece. However, insert 22 is also given a small radial rake angle, $\alpha_B$, of ten degrees. This twists rear corner 32 radially outboard, closer to edge 14 than it would be if it had a zero radial rake. But, as seen best in FIG. 8, doing so also serves to present more of the grinding surface 32 to a potential workpiece, creating what may be thought of as a sufficient working area, outlined by a dotted line at 34. A radial rake angle of 45 degrees would create the maximum size working area 34, but would put elevated corner 32 at a greater radius, taking it closer to cutting corner 24 and to cutter body edge 14. So, a compromise in radial rake angle is achieved, an angle that is great enough to create a working area 34 that is large enough, but small enough to keep elevated corner 32 well away from cutter body edge 14. This combination of elevating, tilting and twisting the grinding inserts 22 allows them to operate as described next.

Referring next to FIG. 9, the workpiece, indicated generally at 36, is a cast iron cylinder head. The surface being milled is the joint face, indicated at 38, which has a width of cut of approximately 7.5 inches. Workpiece 36 would be supported on its side, and the spindle of the milling machine in which cutter 10 would be chucked would be oriented basically horizontal and square to surface 38, with only a very small tilt angle of about 0.002 inches in ten inches. The cutter speed and feed are 1146 RPM at 128 feet per minute, with a depth of cut of 0.1 inches, run in a down milling relation. The roughing inserts 16 make contact first. The lead angle of 2 degrees creates a small clearance of the inboard edges 28 from the milled surface 38. In addition, the lead angle serves to put a somewhat greater length of the outboard edges 26 in contact with a cut face 40, thinning the chips and reducing cutting forces. Of course, the effect would be greater with a greater lead angle for inserts 16, but the basic orientation of the lead angle would still be the same, according to the conventional wisdom.

Still referring to FIG. 9, as the roughing inserts 16 advance, the grinding inserts 22 follow. Unlike conventional finishing inserts or "wipers", which have no lead angle, the grinding inserts 22 have a lead angle, but one that is reversed from the norm. The working areas 34 of the grinding surfaces 30 are dragged across the milled surface 38, grinding it down very slightly. The small axial step of the grinding inserts 22 is enough to remove the machining marks left by the roughing inserts 16. However, as contrasted to the smoothing or sweeping action of conventional wipers, the surface that is left is consistently textured or roughened, rather than shined and smeared. This represents a more desirable seal surface, for the reasons described above. The deliberately tilted orientation of the grinding inserts 22 assures that the milled surface 38 is engaged by the defined working areas 34. The working areas 34 might be greater or lesser in individual cases, depending on the axial tolerances with which the inserts 22 were mounted. Still, more adequate and consistent surface contact would be achieved than that which could potentially result from the same axial tolerances if the grinding inserts 22 were mounted in a dead flat orientation. In that case, some grinding surfaces 30 might miss entirely, and others engage with too much force. In addition, the dragging action of the working areas 34 may be contrasted with the plowing action that would result from a more conventional orientation, where a leading, rather than trailing, portion of the insert made contact. That could potentially chatter and have less stability. The dragging action does force that part of the grinding inserts 22 located below the working areas 34 into compression against the cutter body 14, as shown by the arrow in FIG. 8. Further, the smaller than total area of the working areas 34 create more localized force than would result if the entire grinding surface 30 were engaged. However, the optimized radial rake angle of inserts 22 described above assures that the areas of compression are sufficiently radially distant from the outer edge 14, which is weakened by the pockets 18, so that the cutter body 12 is not unduly stressed.

Variations of the disclosed embodiment could be made. A grinding insert with other than a square shape could be used, so long as it was given a similar orientation. Or, the grinding surface orientation could be "built in" to the grinding insert, in effect, so that the base could be mounted dead flat. It is probably easier to make the grinding insert symmetrical, however, and tilt it as shown in order to achieve the desired grinding surface orientation. Therefore, it will be understood that it is not intended to limit the invention to just the embodiment disclosed.

The embodiments of the invention in which an exclusive property or privilege is claimed are defined as follows:

1. A face milling cutter of the type that is adapted to be rotated about an axis and driven in a path generally normal to said axis across a workpiece, said milling cutter comprising,
    a generally cylindrical cutter body having an outer edge and adapted to be rotated about said axis,
    a plurality of cutting inserts mounted in a circular array to said cutter body outer edge, each cutting insert having at least one cutting corner presented to said workpiece surface to provide a milled surface on said workpiece, and,
    a plurality of grinding inserts mounted in a circular array inboard of said cutting inserts and at a slight axial step relative to said cutting inserts, each grinding insert having a generally flat grinding surface oriented with a small positive axial rake angle and a small reversed lead angle, thereby elevating an inboard trailing portion of said grinding surface, said insert also having a positive radial rake angle large enough to present a sufficiently large working area of said grinding surface elevated trailing portion to said workpiece, but small enough to maintain said working area substantially radially inboard of said cutting insert corners,
    whereby, after said workpiece surface has been initially milled by said cutting inserts, it is ground by said grinding inserts' working areas dragging across said workpiece milled surface, thereby forcing said grinding inserts into compression against said cutter body at a location substantially radially inboard of said cutter body outer edge.

2. A face milling cutter of the type that is adapted to be rotated about an axis and driven in a path generally normal to said axis across a workpiece, said milling cutter comprising,
    a generally cylindrical cutter body having an outer edge and adapted to be rotated about said axis,
    a plurality of cutting inserts mounted in a circular array to said cutter body outer edge, each cutting insert having at least one cutting corner presented to said workpiece surface to provide a milled surface on said workpiece, and,
    a plurality of grinding inserts mounted in a circular array inboard of said cutting inserts and at a slight axial step relative to said cutting inserts, each grinding insert having a generally rectangular and flat grinding surface oriented with a small positive axial rake angle and a small reversed lead angle, thereby elevating an inboard trailing corner of said grinding surface, said insert also having a positive radial rake angle large enough to present a sufficiently large working area of said grinding surface to said workpiece, but small enough to maintain said working area substantially radially inboard of said cutting insert corners,
    whereby, after said workpiece surface has been initially milled by said cutting inserts, it is ground by said grinding inserts, working areas dragging across said workpiece milled surface, thereby forcing said grinding inserts into compression against said cutter body at a location substantially radially inboard of said cutter body outer edge.

3. In a face milling cutter of the type that has a generally cylindrical cutter body with an axis and an outer edge and a plurality of cutting inserts mounted in a circular array to said cutter body outer edge, each cutting insert having at least one cutting corner presented to a workpiece surface to provide a milled surface on said workpiece as said cutter body is rotated about said axis and driven in a path generally normal to said axis, the improvement comprising,
    a plurality of grinding inserts mounted in a circular array inboard of said cutting inserts and at a slight axial step relative to said cutting inserts, each grinding insert having a generally flat grinding surface oriented with a small positive axial rake angle and a small reversed lead angle, thereby elevating an inboard trailing portion of said grinding surface, said insert also having a positive radial rake angle large enough to present a sufficiently large working area of said grinding surface elevated trailing portion to said workpiece, but small enough to maintain said working area substantially radially inboard of said cutting insert corners,
    whereby, after said workpiece surface has been initially milled by said cutting inserts, it is ground by said grinding inserts' working areas dragging across said workpiece milled surface, thereby forcing said grinding inserts into compression against said cutter body at a location substantially radially inboard of said cutter body outer edge.

* * * * *